(12) United States Patent
Ayoub et al.

(10) Patent No.: US 7,337,839 B2
(45) Date of Patent: Mar. 4, 2008

(54) FLUID LOSS ADDITIVE FOR ENHANCED FRACTURE CLEAN-UP

(75) Inventors: Joseph Ayoub, Katy, TX (US); Richard Hutchins, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 71 days.

(21) Appl. No.: 11/150,411

(22) Filed: Jun. 10, 2005

(65) Prior Publication Data

US 2006/0278389 A1    Dec. 14, 2006

(51) Int. Cl.
*E21B 49/00*    (2006.01)
(52) U.S. Cl. .................................................. 166/250.1
(58) Field of Classification Search ............... None
See application file for complete search history.

(56) References Cited

U.S. PATENT DOCUMENTS

| | | | |
|---|---|---|---|
| 3,868,998 A | 3/1975 | Lybargar et al. | 166/278 |
| 3,960,736 A | 6/1976 | Free et al. | 252/8.55 |
| 4,250,044 A | 2/1981 | Hinkel | 252/8.55 |
| 4,387,769 A | 6/1983 | Erbstoesser et al. | 166/295 |
| 4,506,734 A | 3/1985 | Nolte | 166/308 |
| 4,526,695 A | 7/1985 | Erbstesser et al. | 252/8.55 |
| 4,701,247 A | 10/1987 | Kalnins | 204/131 |
| 4,702,848 A | 10/1987 | Payne | 252/8.551 |
| 4,715,967 A | 12/1987 | Bellis et al. | 166/8.551 |
| 4,741,401 A | 5/1988 | Walles et al. | 166/300 |
| 4,848,467 A | 7/1989 | Cantu et al. | 166/281 |
| 4,919,209 A | 4/1990 | King | 166/300 |
| 4,957,165 A | 9/1990 | Cantu et al. | 166/295 |
| 4,961,466 A | 10/1990 | Himes et al. | 166/250 |
| 4,969,526 A | 11/1990 | Cawiezel | 166/300 |
| 5,036,919 A | 8/1991 | Thomas et al. | 166/271 |
| 5,103,905 A | 4/1992 | Brannon et al. | 166/250 |
| 5,164,099 A | 11/1992 | Gupta et al. | 252/8.551 |
| 5,413,178 A | 5/1995 | Walker et al. | 166/300 |
| 5,669,446 A | 9/1997 | Walker et al. | 166/300 |
| 5,939,453 A | 8/1999 | Heller et al. | 514/452 |
| 6,192,985 B1 | 2/2001 | Hinkel et al. | 166/280 |
| 6,394,185 B1 | 5/2002 | Constien | 166/296 |

(Continued)

OTHER PUBLICATIONS

SPE 68977—Visual Observation of Produced Water Re-Injection under Laboratory Conditions by F.A.H. Al-Abduwani, W.M.G.T. van den Broek and P.K. Currie.

(Continued)

*Primary Examiner*—Jennifer H. Gay
*Assistant Examiner*—Kerry W. Leonard
(74) *Attorney, Agent, or Firm*—Darla Fonseca; David Cata; Robin Nava

(57) ABSTRACT

A hydraulic fracturing method is disclosed that includes designing a fracture treatment including a fluid pumping schedule to fracture a subterranean formation according to a design model that accounts for cumulative filter cake thickness, including polymer concentrated at the fracture surfaces, to provide a propped fracture width effectively greater than the cumulative filter cake thickness, and injecting fluids through a wellbore into the formation essentially according to the fluid pumping schedule of the fracture treatment design. A fracturing method is also disclosed that includes placing a high breaker loading in the filter cake. A composition is disclosed which comprises a fluid viscosified with a polymer and a fluid loss additive comprising a delayed breaker.

20 Claims, 4 Drawing Sheets

U.S. PATENT DOCUMENTS

| | | |
|---|---|---|
| 6,509,301 B1 | 1/2003 | Vollmer .................... 507/236 |
| 6,713,087 B2 | 3/2004 | Tracy et al. ................ 424/486 |
| 6,860,328 B2 * | 3/2005 | Gonzalez et al. ........ 166/280.1 |
| 2002/0160920 A1 | 10/2002 | Dawson et al. |
| 2003/0060374 A1 | 3/2003 | Cooke, Jr. ................. 507/200 |
| 2003/0106690 A1 * | 6/2003 | Boney et al. ............... 166/280 |
| 2004/0152601 A1 | 8/2004 | Still et al. .................. 507/100 |
| 2004/0216876 A1 | 11/2004 | Lee ........................ 166/280.1 |
| 2005/0034865 A1 | 2/2005 | Todd et al. ................. 166/304 |
| 2005/0059558 A1 | 3/2005 | Blauch et al. .............. 507/203 |

OTHER PUBLICATIONS

SPE 18211—Laboratory and Field Evaluation of a Combined Fluid-Loss-Control Additive and Gel Breaker for Fracturing Fluids by Lisa A. Cantu and Phil A. Boyd.

* cited by examiner

FLUID LOSS ADDITIVE FOR ENHANCED FRACTURE CLEAN-UP

FIELD OF THE INVENTION

The invention relates to recovery of oil and gas from wells, more particularly to hydraulic fracturing using a job design that accounts for filter cake formation in the fracture, and to enhancing fracture clean-up by placing a viscosity breaker adjacent the fracture surface where polymer is concentrated during leak off. The invention also relates to a fluid loss additive in a hydraulic fracturing fluid comprising a delayed viscosity breaker that can be deposited in a filter cake at the fracture surface.

BACKGROUND OF THE INVENTION

In such oilfield operations as hydraulic fracturing, viscosifiers such as polymer systems are commonly used in carrier fluids. A fluid loss additive (FLA) is often used with such carrier fluids to inhibit excessive fluid loss from the carrier fluid. The FLA helps form a filter cake on the surface of the formation. In a fracturing operation, the fluid efficiency is directly related to the amount of fluid loss. High fluid efficiency minimizes the amount of fluid needed to generate a given length of fracture and limits the amount of filter cake that is generated. FLA's can be used to decrease fluid loss and increase the fluid efficiency. The filter cake formed by the FLA reduces permeability at the fluid-rock interface. Conventional FLA usually consists of fine particles, such as mica or silica flour with a broad distribution of particle sizes designed to effectively plug the pore throats of the rock matrix. Starches or other polymers can be added to help fill in the spaces and further reduce the flow.

The FLA is usually injected into the fracture with the initial pad volume used to initiate hydraulic fracturing. After the pad is injected, proppant slurry, that may also contain an FLA, is pumped into the fracture in various stages depending on job design. The proppant is designed to hold the fracture open and allow reservoir fluid to flow through the proppant pack. The proppant slurry generally includes a viscous carrier fluid to keep the proppant from prematurely dropping out of the slurry. After the proppant has been placed in the fracture, the pressure is released and the fracture closes on the proppant. However, it is necessary to remove or break both the viscosifier in the carrier fluid and the filter cake (that may contain viscosifier polymer) so that reservoir fluids can thereafter flow into the fracture and through the proppant pack to the wellbore and the production string.

Conventional fracture design is well known in the art. See, e.g., U.S. Pat. No. 5,103,905, Method of Optimizing the Conductivity of a Propped Fractured Formation, assigned to Schlumberger.

Fracture clean-up issues are well recognized in the literature. Although other systems such as viscoelastic surfactants, gelled oil, slick water, etc. are used, the majority of fluids used to create the fracture and carry the proppants are polymer-based. In most reservoirs with lower permeability, the polymer concentrates as carrier fluid leaks off during the fracturing process. The concentrated polymer hinders fluid flow in the fracture and often results in underperforming fractures. Typical remedies include use of breakers, including encapsulated breakers that allow a significant increase of the breaker loading. The breaker is added to the fluid/slurry and is intended to reduce the viscosity of the polymer-based carrier fluid and facilitate fracture clean-up. Despite high breaker loading, the retained permeability of the proppant pack is still only a fraction of the initial permeability and this has been the accepted situation in the industry.

Recent study of fracture clean-up issues by the applicants has highlighted the mechanisms of polymer concentration and the role played by the filter cake. Contrary to prevailing theory and the industry-accepted practice of modeling polymer concentration as an average involving all the fluid pumped, applicants have discovered that the filter cake can be the main and only medium where significant polymer concentration takes place. This invention discusses a new approach and method that can take advantage of this discovery to significantly improve the clean-up of hydraulic fracturing treatments.

U.S. Pat. Nos. 4,848,467 and 4,961,466 discuss the use of hydroxyacetic acid and similar condensation products which naturally degrade at reservoir temperature to release acid that may be a breaker for some polymers under some conditions and which offer fluid loss control.

U.S. Pat. No. 3,960,736 (Oree) discusses the use of esters to offer a delayed acid which will break the fluid by attacking the polymer and borate crosslinks. Similarly, acid generation mechanisms are employed in U.S. Pat. Nos. 4,387,769 and 4,526,695 (Erbstoesser), which suggest using an ester polymer. U.S. Pat. No. 3,868,998 (Lybarger) also mentions acid generation.

The use of a hydrolysable polyester material for use as an FLA for fluid loss control has also previously been proposed; further, degradation products of such materials have been shown to cause delayed breaking of fracturing fluids. U.S. Pat. No. 4,715,967 discloses the use of polyglycolic acid (PGA) as a fluid loss additive to temporarily reduce the permeability of a formation. SPE paper 18211 discloses the use of PGA as a fluid loss additive and gel breaker for crosslinked hydroxypropyl guar fluids. U.S. Pat. No. 6,509,301 describes the use of acid forming compounds such as PGA as delayed breakers of surfactant-based vesicle fluids, such as those formed from the zwitterionic material lecithin. The preferred pH of these viscosified fluids is above 6.5, more preferably between 7.5 and 9.5. At a lower pH obtained after activation of the delayed breaker, the viscosity decreases.

These references rely on acid as the breaker, which generally has a relatively low activity, but oxidative breakers are much more effective and have become the industry standard for removing polymer damage. In addition, while low pH may break borate crosslinks, it is less effective for breaking the commonly used zirconium and titanium crosslinked gels. In fact, some gel systems employing zirconium or titanium are designed to be effective viscosifiers at low pH.

Encapsulated breakers based on oxidants and/or enzymes are also well known in fracturing systems. Typically, in the prior art the encapsulated breakers are injected with the proppant in the carrier fluid. The breaker capsules are generally the same size as the proppant particles, to facilitate distribution in the proppant pack and promote breakage when the fracture is closed to release the breaker to react with the viscosifier and reduce the viscosity of the carrier fluid to restore permeability to the proppant pack. The major problems with the conventional encapsulated breakers are several. First, the encapsulation process might leave fissures and cracks in the coating, which allow leakage of the breaker and premature reaction. This is largely an artifact because experiments have shown that increasing pressure will close these cracks and limit leakage. Also, the leakage can be controlled by increasing the thickness of the coating. The second problem is that the amount of encapsulated breaker is small compared to the proppant pack volume. Since reaction of the breaker with the polymer is relatively fast, the polymer near the breaker particle is degraded, but the majority of the polymer is not contacted by the breaker at all. Thus, clean-up is limited by the economics that limit the breaker loading. Third, as discussed in more detail below, applicants have found that the breaker is mostly needed in or near the filter cake. This finding is novel for the industry, where prevailing wisdom suggests that the polymer concentration increases uniformly in the fluid throughout the fracture as calculated by heretofore commonly used fracturing models. Fourth, tradition dictates that more breaker is added toward the end of the treatment.

Traditionally, the breaker has been more concentrated in the tail end of the proppant pumping cycle on the theory that it is more important to reduce the viscosity of the carrier fluid closest to the wellbore. More recently it has alternatively been proposed to include the encapsulated proppant at a higher concentration in the earlier proppant injection stages to obtain a viscosity gradient such that the viscosity of the carrier fluid is at a minimum at the tip of the fracture away from the wellbore and increases as the wellbore is approached. U.S. Pat. No. 6,192,985 (Hinkel, et al.) discloses breaker schedules such that the fluid near the fracture tip breaks first creating a viscosity gradient which causes the fluid resident in the tip to move towards the wellbore where it is more easily removed. Breaker is concentrated in the early proppant pumping stages relative to succeeding and later stages so that the fluid furthest from the wellbore breaks faster than fluid near the wellbore, to establish a viscosity gradient. Gas may also be used to foam the fluid in the early pumping stages to induce a density gradient, and fibrous material may be used in the later pumping stages to stabilize the proppant pack as the energized fluid from near the tip squeezes through the near wellbore region.

As used herein, the term "breaker" refers to a chemical moiety or suite of moieties whose primary function is to "break" or reduce the viscosity of the proppant-carrying matrix. Typically, though not always, this occurs by oxidative reduction. According to conventional practice, the choice of breaker depends upon temperature. Exemplary breakers include: bromate, persulfate, enzymes, acids (e.g., fumaric and nitric acid), and organic peroxide. As previously mentioned, conventional breakers are commonly encapsulated to delay their effect. See, e.g., U.S. Pat. No. 4,741,401, Method for Treating Subterranean Formations, assigned to Schlumberger (disclosing selectively permeable encapsulated breakers that burst upon fluid intrusion). See also, e.g., U.S. Pat. No. 4,506,734, Fracturing Fluid Breaker System Which is Activated by Fracture Closure, assigned to The Standard Oil Company and licensed to Schlumberger (disclosing encapsulated breakers that burst due to pressure created by fracture closure). Electrochemical methods for breaking fracturing fluids are also known. See, U.S. Pat. No. 4,701,247, Electrochemical Methods for Breaking High Viscosity Fluids, assigned to Schlumberger.

In addition, "breaker aids" are often used in conjunction with breakers to promote breaker activity. Breaker aids are disclosed in, e.g., U.S. Pat. No. 4,969,526, Non-Interfering Breaker System for Delayed Crosslinked Fracturing Fluids at Low Temperature, assigned to Schlumberger (disclosing and claiming triethanolamine); and, U.S. Pat. No. 4,250,044. Similarly, "retarding agents" (or materials designed to inhibit cross-linking) are operable in conjunction with the present invention. See, e.g., U.S. Pat. No. 4,702,848, Control of Crosslinking Reaction Rate Using Organozirconate Chelate Crosslinking Agent and Aldehyde Retarding Agent, assigned to Schlumberger (disclosing and claiming aldehydes). Copper ion, silver ion, or the like are also known to function as catalysts in conjunction with a chemical breaker, dissolved oxygen, or other oxidant source, accelerating the breaker activity. In addition, different proppant-carrying matrices can be used with different breaker types—e.g., injecting in a first stage a less viscous and/or less dense fluid followed by fluids of lesser mobility. See, e.g., U.S. Pat. No. 5,036,919, Fracturing with Multiple Fluids to Improve Fracture Conductivity, assigned to Schlumberger. The '919 patent discloses, for instance, pumping a zirconate cross-linked fluid followed by a borate cross-linked fluid. Hence, it is known to use different fluids in different stages of the treatment.

As used herein the term "activity," as in "high-activity breaker" refers to the ability to break (reduce the viscosity) of the proppant-carrying matrix. Hence, activity is a function of chemistry, concentration, and/or temperature. For instance, bromate has a different activity than persulfate; similarly, a greater concentration of bromate has a greater activity than a lower concentration of bromate. In addition, activity can be modulated by encapsulating the breaker (e.g., the '734 patent).

Other references that may be pertinent to the present invention include US2004/0216876; US2005/0034865; and US6394185.

Each of the references mentioned herein are hereby incorporated herein by reference in their entirety for the purpose of US patent practice and other jurisdictions where permitted.

SUMMARY OF THE INVENTION

The present invention takes advantage of the discovery that the polymer can concentrate in the filter cake while the remainder of the fluid remains largely at the initial polymer concentration and does not create a significant flow initiation gradient. By recognizing that the filter cake can invade the proppant pack and choke fluid flow, the fracture treatment can be designed so that the thickness of the proppant pack is for the most part, and preferably, greater than the cumulative thickness of the filter cake, including polymer concentrated adjacent the fracture face. Moreover, the breaker can be preferentially deposited where the polymer is most concentrated, e.g. in the filter cake or otherwise adjacent the fracture face.

Applicants have found that the polymer concentrates at the rock surface and that the concentrated polymer can be considered with any collected fluid loss additive (FLA) particles as a part of the filter cake. The present invention can modify the breaker and the fracture job design to place a delayed, high-activity breaker where the polymer concentrates, e.g. adjacent the filter cake. As used herein, the expressions "adjacent" or "adjacent to" in reference to the filter cake encompass the selective placement of breaker in the filter cake, near the filter cake, or both in and near the filter cake so that the breaker is preferentially activated where the polymer concentration is greater. The current invention provides an FLA containing a breaker system that can be deposited adjacent the filter cake. The current invention also provides a fracturing method wherein a delayed, high activity breaker is placed adjacent the filter cake to enhance fracture clean-up. The current invention also provides FLA comprising delayed high activity breaker, and an encapsulated breaker that can be used as an FLA. Further, in systems where the polymer can contribute to filter cake formation, the present invention can provide a fracturing design method to facilitate formation of propped fracture width that is relatively larger than the cumulative thickness of the filter cake.

In one embodiment, the present invention provides a hydraulic fracturing method that includes designing a fracture job to take the filter cake thickness into account, and then following a fluid pumping schedule to establish a propped fracture width effectively greater than the cumulative filter cake thickness. By using a design model modified to calculate filter cake thickness, for example, the subterranean formation can be hydraulically fractured in such a way that the proppant pack facilitates a low flow initiation gradient, preferably less than 0.045 MPa/m. This model is particularly well-suited to fracture jobs where the polymer can concentrate adjacent the formation face and contributes to the formation of the filter cake, and/or where the filter cake can otherwise be thicker than the size of the individual proppant particles. In contrast to prior art models that calculate an average polymer concentration based on the entire volume between fracture faces and/or assume that the polymer concentrates uniformly everywhere within the fracture, this design model can estimate the filter cake thickness and compare to the propped fracture width to allow the design engineer to vary the design parameters to better optimize the treatment, e.g. ensure that the width of the propped fracture is larger than the cumulative thickness of the filter cake on both faces of the fracture.

In one embodiment, one or more of the injected fluids, e.g., pre-pad, pad, early proppant stages, later proppant stages, etc., or any combination, can include a breaker for delayed reaction with the polymer. The pumping schedule can be designed so that the breaker is deposited adjacent the filter cake at the appropriate point in the fluid injection. In an embodiment, the breaker can comprise fluid loss additive in a pad or pre-pad stage. For example, the fluid loss agent can be in the form of oxidizing breaker coated with a material that hydrolyses to release an acid. The polymer can be a titanium or zirconium crosslinked gel or other system that is operable at low pH and/or resistant to acid breaking.

In another embodiment, the invention provides a delayed breaker composition that can include a fluid viscosified with a polymer and dispersed therein a fluid loss additive comprising a delayed breaker selected from a breaker encapsulated in a non-hydrolysable encapsulant and a breaker coated with a material that hydrolyses, preferably a material that hydrolyses to release an acid. The delayed breaker can be encapsulated in a non-hydrolysable encapsulant in one embodiment, or in another embodiment can be coated with a material that hydrolyses, e.g. to release an acid. The coating material can be selected from the group consisting of lactides, glycolides, polylactic acids, polyglycolic acids, copolymers of polylactic acids and polyglycolic acids, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, mixtures thereof, and the like.

The delayed breaker in the composition can be any high-activity breaker. The breaker can have a particle size less than 100 microns to facilitate the fluid loss function. The composition can optionally include a proppant that can have a relatively larger particle size.

In another embodiment, the invention provides a method of treating a subterranean formation that can include injecting the composition just described into the formation at a pressure sufficient to create a fracture, and forming a filter cake comprising the delayed breaker adjacent the fracture faces. One or more of the polymer-viscosified fluid stages can include proppant, whereupon following the injection the polymer is concentrated adjacent the filter cake, and the breaker can efficiently reduce the viscosity at the filter cake where the polymer is concentrated.

In another embodiment, the present invention provides a method of hydraulically fracturing a subterranean formation that can include injecting a pad volume and proppant slurry through a wellbore into a fracture in the formation according to a pumping schedule wherein (1) a filter cake comprising breaker particles as fluid loss additive is formed in the fracture, (2) polymer is concentrated adjacent the filter cake, and (3) thereafter the breaker is activated to reduce molecular weight of the concentrated polymer to allow fluid flow through a proppant pack in the fracture. The thickness of the filter cake and concentrated polymer on each fracture face can be less than one half the fracture width.

In a further embodiment, there is provided a method of hydraulically fracturing a subterranean formation comprising injecting a pad volume and proppant slurry through a wellbore into a fracture in the formation according to a pumping schedule wherein a filter cake comprising breaker particles as fluid loss additive and concentrated polymer is formed in the fracture, and the breaker is thereafter activated to reduce molecular weight of the concentrated polymer and initiate fluid flow through a proppant pack in the fracture. The filter cake on opposing surfaces of the fracture upon closure can be spaced apart by a continuous layer of proppant and interstitial slurry fluid, and the proppant pack can have a low flow initiation gradient, e.g. less than about 0.045 MPa/m.

DETAILED DESCRIPTION OF EMBODIMENTS OF THE INVENTION

Figure 1:
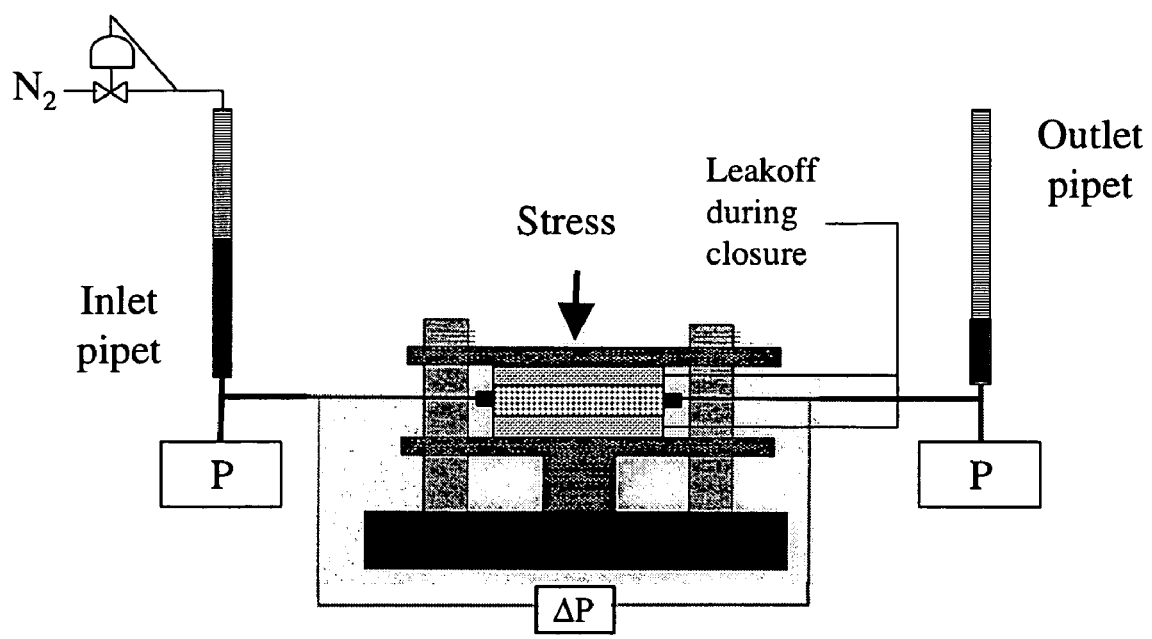
FIG. 1 is a schematic of the flow initiation gradient (FIG) apparatus used in the examples below.

The present invention provides a method for designing a fracture treatment wherein the propped fracture width is effectively maintained larger than the cumulative thickness of the filter cake. This can be achieved using a fracture design model specially modified to calculate the filter cake thickness as opposed to calculating an average proppant concentration as typically done in the industry. Commercially available design models that can be modified within the scope of the invention to select the appropriate values of the necessary parameters include simulators, such as a fracturing simulators, such as, for example, the fracturing simulator commercially available under the trade designation FracCADE from Schlumberger Technology Corporation, Sugar Land, Tex., U.S.A., to achieve the objects of the invention.

The fracture simulator can be employed to design a fracture treatment in which the filter cake is limited in thickness to less than one-half the available fracture width over a majority of the fracture length. One primary variable for achieving this design goal is the proppant loading in the proppant slurry, which generally can be made as high as possible but most certainly greater than 719.0 g/L (6 lb per gallon). Generally the maximum level of proppant loading is limited by transport issues and is near 3000 g/L (25 lb per gallon). The actual required values can depend upon each individual case. Generally, proppant loadings in the fracture of more than 9.76 kg/m$^2$ (2 lb/ft$^2$) are desired for a proper design. A second important variable to avoid screen outs and maximize proppant loading is the proppant schedule, which includes flow rate of clean fluid and proppant.

A third necessary variable is a fluid viscosity that can be sufficient to generate fracture width and prevent undue settling of the proppant within the fracture during fracture propagation. Generally the polymer concentration is reduced to a point so as to avoid proppant pack damage but maintain sufficient viscosity for opening the fracture and transporting proppant. Since the present invention can allow better cleanup of the fracture, higher concentration of polymer can be utilized to facilitate a primary goal of higher proppant loading in the fracture. Preferred polymer concentrations can vary with temperature, fluid system, formation depth and proppant properties and loading but non-limiting exemplary ranges can include 1.2 to 9.6 g/L (10 to 80 lb of polymer per 1000 gallons), and more preferably 1.8 to 4.8 g/L (15 to 40 lb of polymer per 1000 gallons). Typical polymers can include galactomannans such as guar, derivatized guars such as hydroxypropyl guar, carboxymethyl guar, carboxymethylhydroxypropyl guar, hydrophobically modified galactomannans, xanthan gum, hydroxyethylcellulose, and polymers, copolymers and terpolymers containing acrylamide monomer, and the like. The polymers can optionally be crosslinked with metals ions such as borate, zirconium or titanium including complexed metals, and so on. Other additives frequently used include surfactants, thermal stabilizers, conventional breakers and breaker aids, antifoaming agents, pH buffers, scale inhibitors, water control agents and cleanup additives, and the like.

This invention also provides a method in a fracturing system where, after the treatment, there is differential viscosifier concentration in the fracture. The fracturing job can be designed to deliver a high breaker loading within the fracture where the viscosifier is disproportionately concentrated and a relatively decreased breaker loading where the viscosifier is less concentrated. In fracturing systems such as those employing polymer-based carrier fluids where it has now been found that the filter cake is the primary viscosifier concentration zone, the breaker can be included as fluid loss additive (FLA) to be deposited in the filter cake. An important option is that a single additive can serve as both the FLA and breaker, i.e. as the only FLA and as the only breaker. When activated after an appropriate delay to allow proper proppant placement within the fracture, the breaker reduces the viscosity and yield stress where the carrier fluid remaining in the proppant pack contains the most polymer, e.g. adjacent the filter cake, and can thus lead to enhanced clean-up of the proppant pack. Conventionally placed breaker or encapsulated breaker can optionally be included.

The amount of breaker required can depend upon the thickness of the filter cake relative to the fracture width. As the filter cake becomes dominant, more breaker may be required. Not all of the filter cake needs to be broken; it can be sufficient to create multiple pathways through the filter cake along the length of the fracture that can allow relatively unimpeded flow of fluids from the reservoir into the proppant pack. Although a few of these pathways can be created without the help of breakers, judicious use of breakers can greatly enhance the number and flow capacity of these pathways. Breaker schedules can include higher loading of the FLA-breaker in the pre-pad and/or pad stages, where the filter cake is first established, than in the subsequent proppant stages where less filter cake is formed. Desirable breaker levels can be 1.2 to 4.8 g/L (10 to 40 pounds per 1000 gallon) in the pad stages, and 0.12 to 2.4 g/L (1 to 20 lb per 1000 gallon) in the proppant stages. More FLA-breaker or inert (non-breaker) FLA particles can be used where additional filter loss control is required. Desirably, the job design can be based on available experimental and field validation data (see examples below), and more desirably, the job design model can be used to calculate the quantity of FLA-breaker that is deposited. Typically, conventional (non-FLA) encapsulated breakers can also be used in both pad and proppant stages. If desired, dissolvable breaker can be used in the last stages to achieve a quicker break of the carrier fluid near the wellbore.

Where premature screen out and the corresponding reduction of the achievable fracture length are undesirable, the fluid loss additives as taught herein can be used to limit the occurrence of screen out and to increase the fluid efficiency. The amount of FLA-breaker can be proportional to the amount of filter cake generated, e.g. as shown by a fracture simulator or based on experimental data. Typical FLA-breaker ranges can be 0.03 to 4.8 g/L (0.25 to 40 pound per 1000 gallon), and more typically, 0.12 to 1.2 g/L (1 to 10 pound per 1000 gallon). Those skilled in the art can use the simulator and adjust the proppant loadings, stage volumes and fluid properties to ensure that the final propped width is effectively larger than the filter cake thickness.

In another aspect, the invention provides an encapsulated or other delayed breaker that has the characteristics of a fluid loss additive (FLA) during treatment, e.g. in the pad, and in the carrier fluid, and after pump shut down and/or fracture closure, releases or activates the breaker in the vicinity of the filter cake, preferably directly into the filter cake. Before pump shut down or before closure, the encapsulation or other delaying mechanism inhibits significant loss of activity of the breaker and consequently makes the break of the polymer or other viscosifier a delayed reaction.

Typically, the delayed breaker can have a particle size less than 100 mesh (150 microns), in some embodiments between 150 and 325 mesh (about 40 to 100 microns), and in other embodiments less than 325 mesh (about 40 microns), as needed to be an effective fluid loss additive for the formation. In general, the larger breaker sizes are used to treat high permeability formations and formations with natural fissures, whereas the smaller sizes are used with low permeability formations. It is often appropriate to use a mixture of particles of different sizes, for example a bimodal distribution. The delayed breaker is used in quantities sufficient to impact the filter cake yield stress and its viscosity. Yield stress is manifested by a flow initiation pressure or pressure gradient to initiate flow. Below this threshold, the polymer will not move and at or above this gradient, flow begins.

The combined breaker-FLA may be used in conjunction with other materials that aid in fluid loss, such as silica flour, mica, or polymers such as starch or guars, provided either that the additional material is at least partially degraded after closure, or is present in a sufficiently small amount that it does not seriously detract from the efficacy of the treatment.

The filter cake need not be entirely broken; it is sufficient only that enough breaking occur so as to reduce the FIG as shown in the experimental data and to facilitate the flow of fluids from the reservoir into the propped fracture without significant restriction. In general, flow throughout the propped fracture parallel to the fracture plane can be more important than complete elimination of flow impairment from the formation through the fracture face.

The invention has dual advantages. The delayed breaker particles first can serve as fluid loss additive to help minimize the amount of carrier fluid used, which means less polymer concentration during treatment. Then, the breaker-FLA can serve as a delivery mechanism for delayed activation of the high activity breaker directly where it is needed most, i.e. in the concentrated polymer in or near the filter cake.

The present invention can employ encapsulated or otherwise delayed breakers of sufficiently small size that replace all or a portion of the particles in the FLA. After closure of the fracture, in one embodiment, the increasing stress ruptures the encapsulation and releases the breaker. The breaker can then readily react with the polymer adjacent the filter cake, causing polymer chain scission and reductions in molecular weight. Where stress rupture of the breaker-FLA is impractical, for example in some formations where the size of the breaker-FLA particles is small relative to the pore size of the rock formation and/or the job design calls for proppant that is substantially larger than the FLA particles, the breaker can be encapsulated with a material that results in bursting by osmotic pressure, that facilitates electrochemical rupture, that dissolves in a controlled manner at treatment conditions, or the like. For example, formation temperature and fluid pH changes can be used to initiate breaker-polymer reaction adjacent the filter cake after pump shut down.

Various chemicals can be employed as breakers in the present invention, including aqueous soluble sodium, ammonium or potassium persulfates, bromates, hypochlorites, chlorites, peroxides, perchlorates, and the like. Less soluble breakers may contain calcium or magnesium as the counter ion and thereby achieve a delay. The temperature at which these chemicals become reactive varies, with persulfates for example being effective from about 52° C. (125° F.) and higher. At higher temperatures, the persulfates are too reactive and they will prematurely degrade the polymer-based fluid. Encapsulation is a technique to prevent this reaction by physical separation of the reactants. In a particularly preferred embodiment, a high activity breaker such as persulfate can be encapsulated with polyglycolic acid (PGA), polylactic acid (PLA), or other slowly hydrolysable polyester that forms acid and lowers the pH at the formation conditions, (as described in commonly assigned US Patent Application Publication No. 2004-0152601, "Generating Acid Downhole in Acid Fracturing," Dismuke et al., hereby incorporated in its entirety) to prevent premature loss of viscosity. These acid-forming coatings are not generally considered highly active breakers by themselves in the context of this invention, but can provide a self-destructive encapsulation material and assist or facilitate breaking of the viscosifier for fracture clean-up when used in conjunction with a high activity breaker encapsulated thereby.

Various techniques for encapsulation are known that can be used to manufacture the FLA-sized breaker in the present invention. U.S. Pat. No. 4,506,734 (Standard Oil Co.) discloses breaker within hollow beads that are crushed. U.S. Pat. No. 4,741,401 (Dow Chemical Co.) discloses capsules with breaker that rupture under influence of a fluid that can permeate the coating. U.S. Pat. No. 4,919,209 (Dowell Schlumberger) discloses capsules with breaker dissolved in a fluid. U.S. Pat. No. 5,164,099 (Western Co.) discloses breaker diffusion through a membrane capsule containing breaker. U.S. Pat. Nos. 5,413,178 and 5,669,446 (Halliburton) disclose inactive breaker (at the temperature of use) that is activated by a second catalyst. Also, the breaker can be deployed in a slurry or emulsion of oil such as diesel which is known to be a good fluid loss additive, and this can place the breaker along the rock face where it can then be released as the oil dissipates.

Other methods for encapsulating the breaker can include: (1) spray coating by spraying a melt or solution of encapsulating material into a fluid bed of the breaker particles; (2) spraying the breaker with a wax of a given melting point commensurate with the reservoir temperature; (3) pelletizing the breaker with a binder that breaks apart and releases the breaker; (4) fluidized bed coating such as the Glatt process with appropriate modification for obtaining the desired particle size; and (5) pan coating where the breaker is immersed in a solution in which the polymer or other encapsulating material is dissolved (and the breaker is insoluble) and then dried to form a film or coating on the breaker particles. Further, breakers, breaker delay methods, and breaker aids cited in the background section of the specification above can be used in the invention.

The invention can place the breaker adjacent the filter cake where it is most effective and most needed. This improves the economics by enhancing the efficiency of contacting the concentrated polymer. By also limiting fluid loss, the invention improves the fluid efficiency and reduces fluid costs as well as required breaker volumes. Another embodiment comprises mixing an encapsulated breaker with a known FLA to achieve optimum efficiency in fluid loss, which may require a broad particle size distribution, and to achieve optimal, delayed breaking of the polymer located in or near the filter cake.

EXAMPLES

Multiple runs were conducted using flow initiation gradient (FIG) measurement equipment to investigate the effect of the chemical breaker ammonium persulfate on borate crosslinked guar. The equipment consisted of a modified standard API conductivity cell in which a fracturing fluid and proppant were placed between two slabs of reservoir rock as shown schematically in FIG. 1. The rock was Ohio sandstone with a permeability near 0.1 mD. On the external side of the rock there were two pistons that allowed a closure stress to be applied to the rock and the proppant pack. The pistons had an internal fluid path so that any fluid that leaked off into the slabs from the pack was recovered outside of the cell. This process served to concentrate the fracturing fluid, as only brine will pass through the tight rock matrix. Typically, the leak off process continued until the pistons moved to a point where the proppant supported the closure stress. The final average concentration factor of the polymer in the fracturing fluid varied from about 3 to about 25, depending upon the volume of fluid placed in the cell relative to the amount of proppant. Proppant was loaded at two concentrations, 9.76 and 19.52 kg/m$^2$ (2 and 4 lb/ft$^2$).

For a typical run, a 9.76 kg/m$^2$ (2 lb/ft$^2$) loading of 0.432 to 0.838 mm (20/40 mesh) Ottawa sand (63 grams) was placed on top of the lower sandstone slab inside the cell with 10 ml of borate-crosslinked guar (4.79 g/L) (40 lb guar per 1000 gallons of fluid) fracturing fluid and the pack was leveled. About 240 mL of additional borate-crosslinked fluid was added on top of the proppant. The upper slab was inserted into the cell and the air was removed from beneath the cell so the rock contacted the fracturing fluid. The upper piston was then inserted and the apparatus put into a hydraulic press. Closure stress on the pistons was increased to 17.24 MPa (2500 psi) over 90 minutes and fluid loss occurred. In one run, fluid loss consisted of 220 mL, making the concentration factor equal to 8.3 (250 mL loaded divided by 30 mL left). This means the average polymer concentration increased from 4.79 g/L (40 lb guar per 1000 gallons) to about 39.53 g/L (330 lb guar per 1000 gallons) of fluid.

Figure 2:
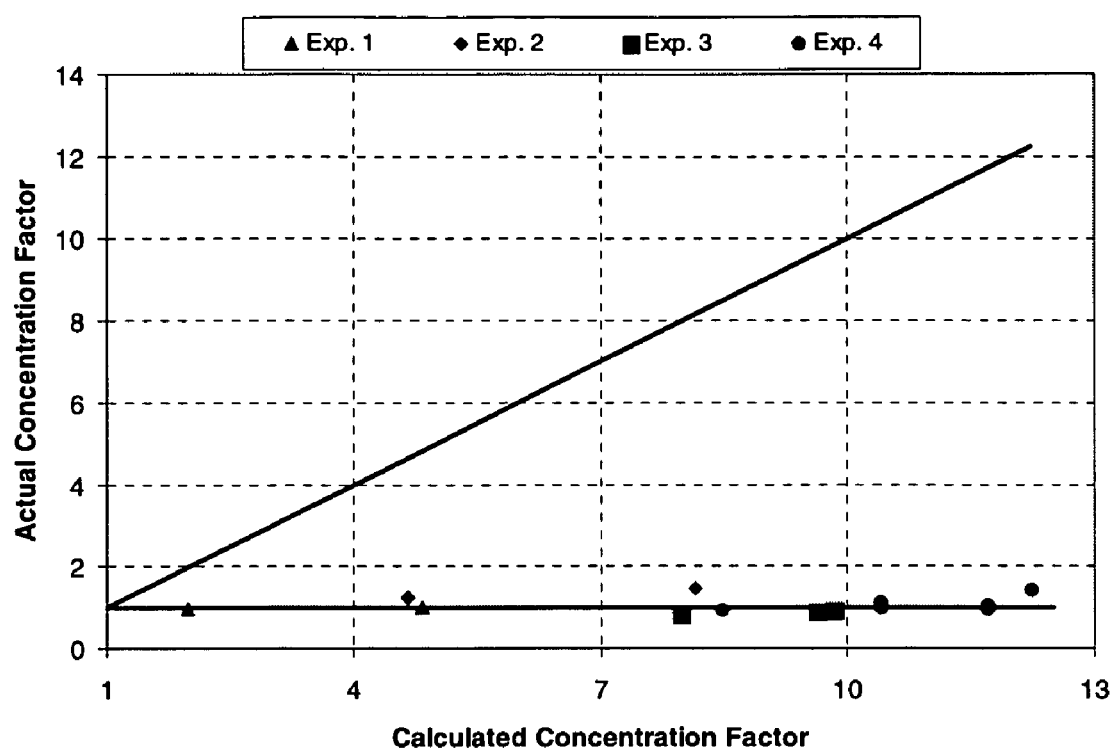
FIG. 2 summarizes the results of polymer concentration tests run using the fracture conductivity cell of FIG. 1.

Applicants have unexpectedly found that polymer concentration occurs mainly in the filter cake while the remainder of the fluid remains at or near the original fluid concentration, as shown in FIG. 2. Using the 4.79 g/L of borate cross-linked polymer solution (40 lb borate-crosslinked polymer per 1000 gallons of fluid), four experiments were run at various concentration factors achieved by applying closure stress and allowing leakoff of the water through the rock plates. The maximum concentration factor achieved, 12.2, represents an average polymer concentration of 58.46 g/L (488 lb polymer per 1000 gallons of fluid). Samples taken at different calculated concentration factors from a point in the proppant pack above the bottom rock face (which became nearly equidistant from the two rock faces at the end of the experiment) were analyzed for polymer content and the results plotted on the graph shown in FIG. 2. The concentration of the mobile polymer was essentially unchanged from that of the injected polymer. If the entire fluid had concentrated, the measurements of polymer concentration would have clustered around the diagonal line rather than the horizontal line. The conclusion is that nearly all the polymer concentration occurred disproportionately adjacent the filter cake, rather than concentrating uniformly in the bulk carrier fluid.

Figure 3:
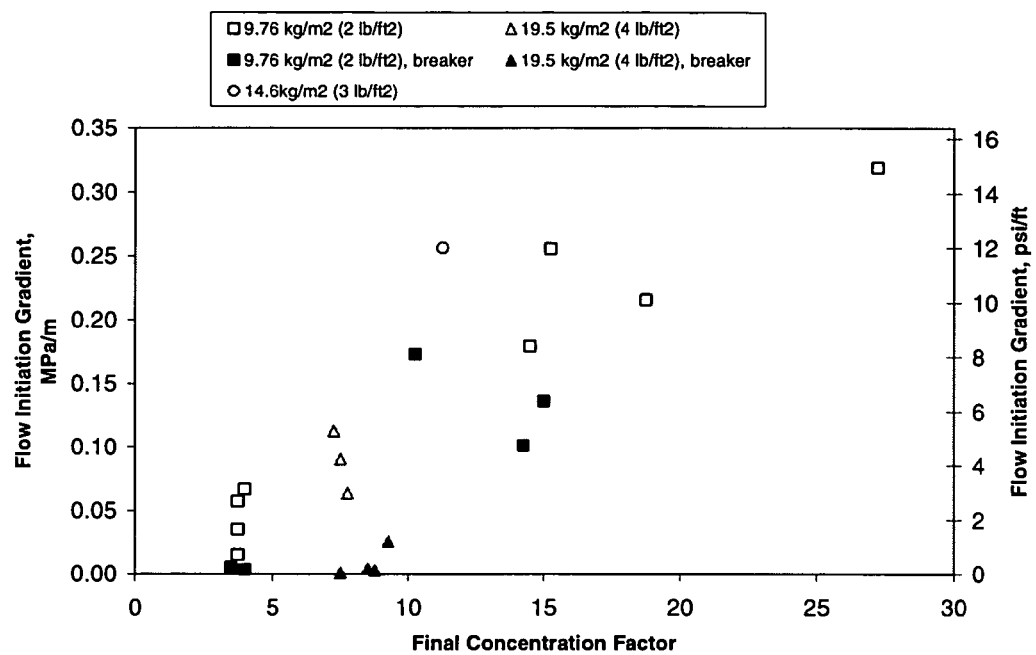
FIG. 3 shows the flow initiation gradient (FIG) versus the final average concentration of polymer and summarizes experiments in which the average polymer concentration factor and the fracture width were varied and the flow initiation gradient was measured for the different cases with and without soluble breaker at a concentration of 0.479 g/L (4 lbs/1000 gal).

The filter cake formed was very viscous with a high yield stress and may have had a polymer concentration of 71.88 to 119.8 g/L (600 to 1000 lb polymer per 1000 gallons), or more. If the filter cake is thick relative to the width of the fracture, the flow initiation gradient (FIG) increases and clean-up with conventional methodologies is likely to be highly impaired. FIG. 3 summarizes experiments where the average polymer concentration factor and the fracture width were varied and the FIG was determined for the different cases with and without soluble breaker at a concentration of 0.479 g/L (4 lbs/1000 gal). As the concentration factor increased for a given fracture width, the FIG increased. When dissolvable breaker was used, the FIG was near zero at low concentration factors. However, at high concentration factors for the 9.76 kg/m$^2$ (2 lb/ft$^2$) proppant loading, the breaker was only marginally effective. By increasing the proppant loading (fracture width) to 19.52 kg/m$^2$ (4 lb/ft$^2$), the breaker was once again effective even at intermediate concentration factors.

This finding shows that job design for successful implementation of the concepts of the invention can include a step for determining the proppant loading needed to impact the filter cake and/or a step for determining the breaker loading needed in the pad and the various proppant pumping stages.

To investigate the impediment to flow that the filter cake represents in a true fracture and the extent to which this can lead to poor performance of the fracture, a flow initiation gradient (FIG) measurement technique was developed. Following the leak off process and the creation of the filter cake at the interface between the proppant pack and the rock, the system was allowed to age at 52° C. (125° F.) overnight. The next morning, the inlet pressure to the proppant pack was slowly raised in steps until flow was established. The flow initiation pressure is defined as the pressure at the inlet when flow begins. When compared to the outlet pressure, the flow initiation pressure can be used to calculate how much pressure gradient is required to start the flow through the concentrated fracturing fluid. Thus, results are normally reported as flow initiation gradient (FIG) in MPa/m (psi/ft).

Figure 4:
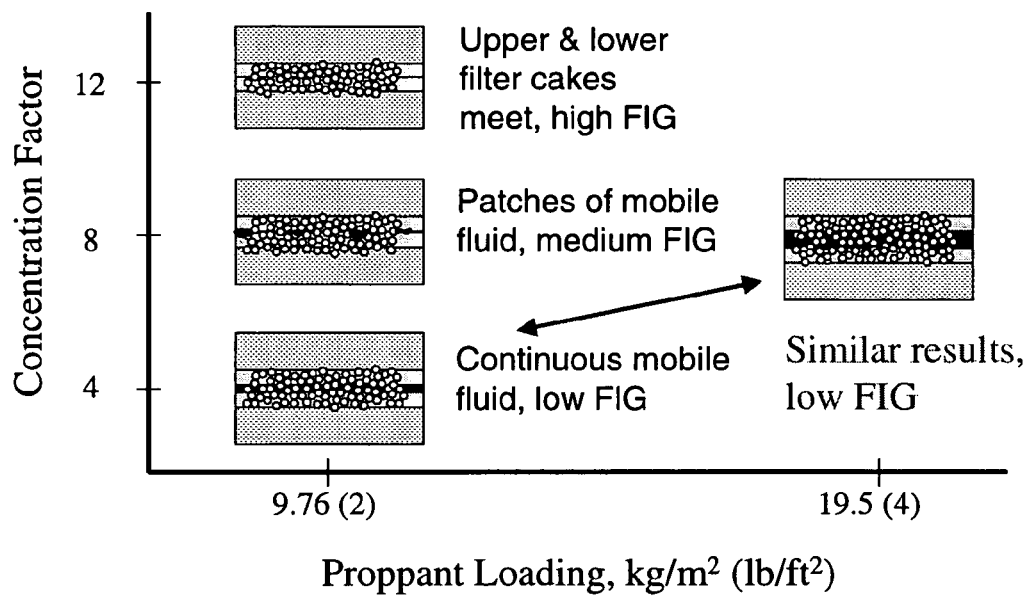
FIG. 4 is a schematic conceptual model for filter cake effect according to selected embodiments of the present invention.

As shown in FIG. 3, it was found that adding dissolved ammonium persulfate breaker to the fracturing fluid lowered the FIG compared to the case without breaker, but only when the concentration factor was less than about 5. Higher concentration factor experiments also benefited from the breaker when the proppant concentration was 19.52 kg/m$^2$ (4 lb/ft$^2$). However, at 9.76 kg/m$^2$ (2 lb/ft$^2$) and concentration factors higher than 5, the FIG remained high whether breaker was added or not. Although not wishing to be bound by theory, this can be explained by the thickness of the filter cake relative to the pack width. At 9.76 kg/m$^2$ (2 lb/ft$^2$) proppant loading, the filter cake for low concentration factors did not extend completely across the pack width whereas at higher concentration factors, the filter cake was nearly continuous between the two slabs. Thus, breaker in the carrier fluid was effective at lowering the viscosity of the 4.792 g/L (40 lb per 1000 gallon) fluid and allowing flow at low pressure gradients between the filter cakes, but breaker in the carrier fluid was ineffective at lowering the viscosity of the concentrated polymer in the filter cake. Shown in FIG. 4 is the conceptual model that fits these data and explains the need for placing breaker at the point where filter cake forms.

An encapsulated breaker was also tested in which solid ammonium persulfate was encapsulated in a polymer coating that ruptured during the closure process, releasing the active breaker. It was found that randomly distributing the encapsulated breaker within the proppant pack was ineffective at reducing the FIG. However, when the encapsulated breaker was layered and concentrated at the rock-proppant pack interface, it was effective at reducing the FIG even at lower loading than when random distribution was used. Thus, breaker placed into the space where filter cake formed was effective at reducing the required FIG, and cleanup of the fracture occurred. It was also found that increasing the concentration of the breaker enhanced the reduction in FIG. A method employing placing the breaker at the rock-proppant pack interface to enhance cleanup of the fracture is supported by these experiments.

Shown in Table 1 are the data for the addition of encapsulated breaker to the proppant pack. "Layered" means the breaker was added to the rock-proppant pack interface before proppant and additional fracturing fluid were added to the cell. Also, breaker was added after all fracturing fluid was added and just prior to insertion of the upper slab. "Dispersed" means that the breaker was mixed with the solid proppant randomly throughout the pack as per the current industry practice. The results clearly show the enhancement obtained by layering the breaker at the point where filter cake will be generated. Also, the results show the effect of adding 0.4792 g/L (4 lb per 1000 gallon) un-encapsulated breaker to the fracturing fluid. At low concentration factors and both proppant loadings, the breaker was effective in lowering the FIG. At high proppant loadings and high concentration factors, the breaker was also effective. At low proppant loading and high concentration factor, the breaker was no longer effective.

TABLE 1

Results of Breaker Experiments

| Run No. | Additive | Concentration Factor | FIG, MPa/m (psi/ft) | Proppant loading, location of breaker |
|---|---|---|---|---|
| 1 | None | 4.0 | 0.068 (3.0) | 9.76 kg/m$^2$ (2 lb/ft$^2$) |
| 2 | None | 7.25 | 0.113 (5.0) | 19.52 kg/m$^2$ (4 lb/ft$^2$) |
| 3 | None | 15.3 | 0.249 (11.0) | 9.76 kg/m$^2$ (2 lb/ft$^2$) |
| 4 | 0.4792 g/L breaker (4 lb breaker/1000 gal) | 3.5 | 0.0059 (0.26) | 9.76 kg/m$^2$ (2 lb/ft$^2$), in frac fluid |
| 5 | 0.4792 g/L breaker (4 lb breaker/1000 gal) | 10.3 | 0.172 (7.6) | 9.76 kg/m$^2$ (2 lb/ft$^2$, in frac fluid |
| 6 | 0.599 g/L Enc. Breaker (5 lb Enc. breaker/1000 gal) | 19.8 | 0.0226 (1.0) | 9.76 kg/m$^2$ (2 lb/ft$^2$), Layered |
| 7 | 2.396 g/L Enc. Breaker (20 lb Enc. breaker/1000 gal) | 15.8 | 0.0152 (0.67) | 9.76 kg/m$^2$ (2 lb/ft$^2$), Layered |
| 8 | 4.792 g/L Enc. Breaker (40 lb Enc. breaker/1000 gal) | 19.0 | 0.0066 (0.29) | 9.76 kg/m$^2$ (2 lb/ft$^2$), Layered |
| 9 | 2.396 g/L Enc. Breaker (20 lb Enc. breaker/1000 gal) | 25.0 | 0.208 (9.2) | 9.76 kg/m$^2$ (2 lb/ft$^2$), Dispersed |
| 10 | 4.792 g/L Enc. Breaker (40 lb Enc. breaker/1000 gal) | 16.0 | 0.167 (7.4) | 9.76 kg/m$^2$ (2 lb/ft$^2$), Dispersed |

These examples indicate that excellent fracturing results can be obtained by using an additive that is both a fluid loss additive and a breaker for the viscosifier, in other words a delayed breaker that is sized to be an effective FLA for the fluids and formation in question.

These results indicate that improved fracture cleanup is achieved by ensuring that after fracture closure there is sufficient breaker/FLA in the filter cake to break enough of the viscosifier in the filter cake after an appropriate time.

These results also indicate that the job should be designed so that the thickness of the fracture is more than twice the thickness of the filter cake so that there is room available for immediate flow of unaltered carrier fluid in the center of the fracture.

Although the invention is described in terms of hydraulic fracturing it is to be understood that it is applicable to any treatment in which a viscosified fluid is used in a way that it could form a polymer-containing filter cake that the operator would want to remove. Non-limiting examples include gravel packing, frac-packing, drilling, and completion of a well, and so on.

What is claimed is:

1. A hydraulic fracturing method, comprising:
   designing a fracture treatment including a fluid pumping schedule to fracture a subterranean formation according to a design model that accounts for cumulative filter cake thickness to provide a propped fracture width effectively greater than the cumulative filter cake thickness; and
   injecting fluids through a wellbore into the formation essentially according to the fluid pumping schedule of the fracture treatment design, wherein the design model calculates the filter cake thickness, wherein the calculated filter cake thickness exceeds the particle size of proppant and the design model accounts for filter cake thickness in average proppant concentration calculations.

2. The method of claim 1 wherein the fluid pumping schedule includes one or more polymer-viscosified proppant slurry stages and the calculated filter cake thickness includes a contribution from polymer accumulation adjacent faces of the fracture.

3. The method of claim 2 wherein one or more of the injected fluids includes a breaker for delayed reaction with the polymer.

4. The method of claim 3 wherein the breaker is deposited adjacent the filter cake in the fluid injection.

5. The method of claim 4 wherein the breaker comprises fluid loss additives in a pad or pre-pad stage.

6. The method of claim 4 wherein the breaker comprises fluid loss additives in pad and pre-pad stages.

7. The method of claim 5 wherein the polymer fluid is selected from borate, zirconate, and titanate crosslinked gels.

8. The method of claim 5 wherein the fluid loss additive comprises oxidizer coated with a material that hydrolyses to release an acid.

9. A method of treating a subterranean formation penetrated by a wellbore comprising injecting the composition of claim 7 into the formation at a pressure sufficient to create a fracture in the formation, said fracture having opposing faces, and forming a filter cake comprising the delayed breaker adjacent the fracture faces.

10. The method of claim 9, wherein the fluid of claim 7 further comprises proppant, further comprising injecting the proppant-containing fluid into the formation, whereupon following the injection the polymer is concentrated adjacent the filter cake, and allowing the breaker to reduce the viscosity of the filter cake.

11. A hydraulic fracturing method comprising designing a fracture treatment including a fluid pumping schedule to fracture a subterranean formation according to a design model that accounts for cumulative filter cake thickness to provide a propped fracture width effectively greater than the cumulative filter cake thickness; and injecting fluids through a wellbore into the formation essentially according to the fluid pumping schedule of the fracture treatment design, wherein the injected fluids comprise a fluid viscosified with a polymer and dispersed therein a fluid loss additive comprising a delayed breaker wherein the delayed breaker is encapsulated in a non-hydrolyzable encapsulant.

12. The method of claim 11 wherein the delayed breaker is coated with a material that hydrolyses to release an acid.

13. The method of claim 12 wherein the delayed breaker is coated with a material selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

14. The method of claim 11 wherein the delayed breaker comprises high-activity breaker.

15. The method of claim 11 wherein the polymer fluid is selected from borate, zirconate, and titanate crosslinked gels.

16. The method of claim 11 further comprising a proppant.

17. The method of claim 11 wherein the fluid loss additive has an average particle size less than 100 microns.

18. A method of hydraulically fracturing a subterranean formation comprising injecting a pad volume and proppant slurry through a wellbore into a fracture in the formation according to a pumping schedule wherein a filter cake comprising breaker particles as a fluid loss additive and concentrated polymer is formed in the fracture, and the breaker is thereafter activated to reduce molecular weight of the concentrated polymer and initiate fluid flow through a proppant pack in the fracture wherein the filter cake on opposing surfaces of the fracture upon closure is spaced apart by a continuous layer comprising proppant and interstitial slurry fluid.

19. The method of claim 18 wherein the breaker particles are smaller than the proppant.

20. The method of claim 18 wherein the proppant pack has a flow initiation gradient less than about 0.045 MPa/m.

* * * * *